United States Patent [19]
Zimmerly et al.

[11] Patent Number: 5,390,694
[45] Date of Patent: Feb. 21, 1995

[54] VAT BOTTOM FILL CIP SYSTEM

[75] Inventors: Robert D. Zimmerly, Kenosha; Richard Kramer, Racine, both of Wis.

[73] Assignee: Tri-Clover, Inc., Kenosha, Wis.

[21] Appl. No.: 136,290

[22] Filed: Oct. 13, 1993

[51] Int. Cl.[6] ............................................. F16K 11/20
[52] U.S. Cl. .................................... 137/240; 137/312; 137/596; 137/597
[58] Field of Search ................. 137/240, 312, 596, 597

[56] References Cited

U.S. PATENT DOCUMENTS

| | | |
|---|---|---|
| 3,570,314 | 3/1971 | Wagner . |
| 4,199,130 | 4/1980 | Stoll et al. . |
| 4,286,624 | 9/1981 | Clausen et al. . |
| 4,312,372 | 1/1982 | Amos et al. . |
| 4,436,106 | 3/1984 | Tuchenhagen et al. ............ 137/240 |
| 4,911,832 | 3/1990 | Miller et al. ..................... 137/240 X |
| 4,941,593 | 7/1990 | Hicks et al. ..................... 137/240 X |
| 5,226,449 | 7/1993 | Zimmerly . |
| 5,232,023 | 8/1993 | Zimmerly . |
| 5,275,201 | 1/1994 | Zimmerly . |

Primary Examiner—Stephen M. Hepperle
Attorney, Agent, or Firm—Ryan, Kees & Hohenfeldt

[57] ABSTRACT

A fluid flow control assembly for controlling the flow of fluids to and from a number of tanks, and for controlling the communication of that flow. Raw material, product, CIP solution and drain conduits pass near to the tanks. The fluid flow control assembly which is the subject of this invention includes three sets of valves. One set of valves regulates the flow of raw materials from the first conduit into the tanks. Another set of valves regulates the flow of product out of the tanks into the second conduit. A third set of valves regulates the flow of CIP solution out of the tanks into the third conduit. Each set of valves prevents flow of fluid into or out of its respective conduit when desired, such that one of the tanks can be being filled at the same time another of the tanks is being emptied of product and a third one of the tanks is being flushed with CIP solution. The valves are arranged to provide double block and bleed functionality for the fluids not intended to flow to or from the tank at a particular time, with a full bore transparent leak conduit between each pair of blocks.

7 Claims, 6 Drawing Sheets

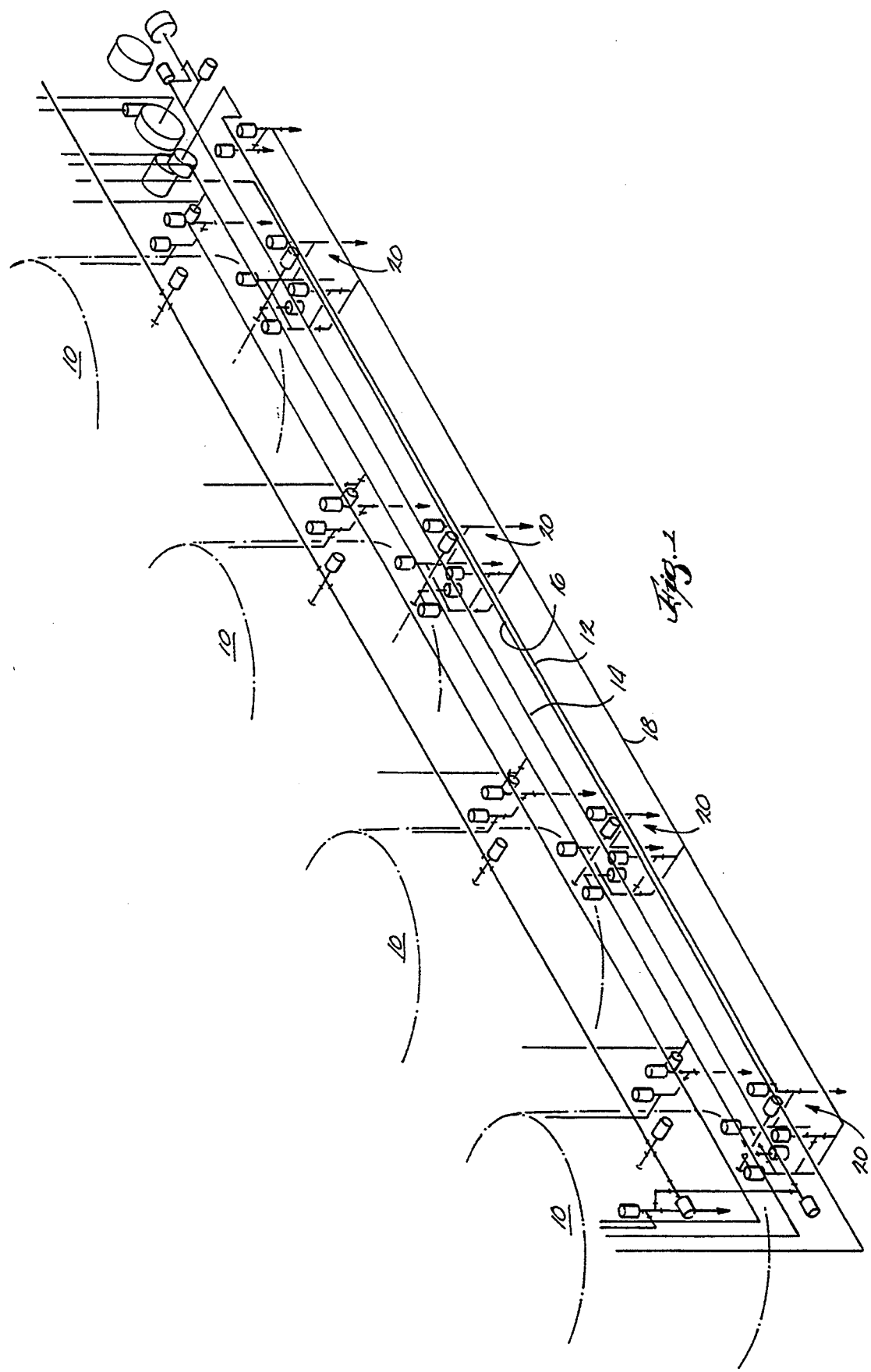

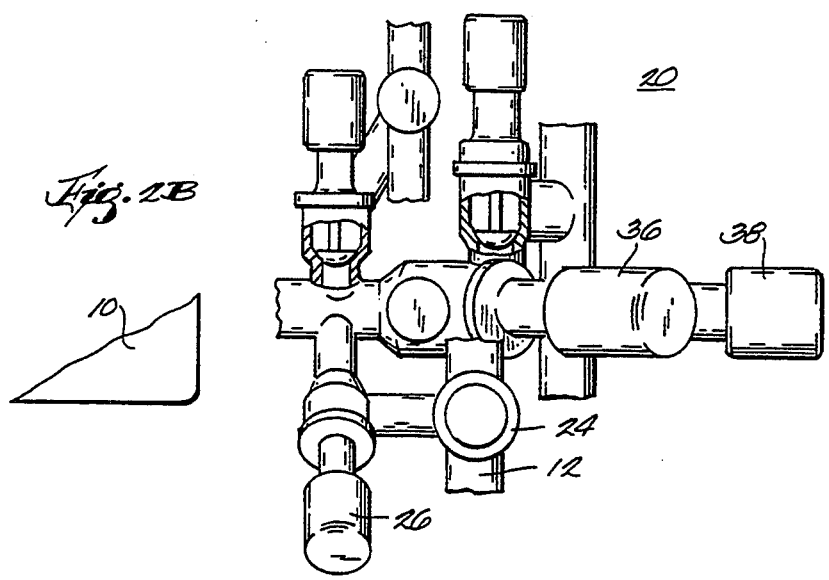
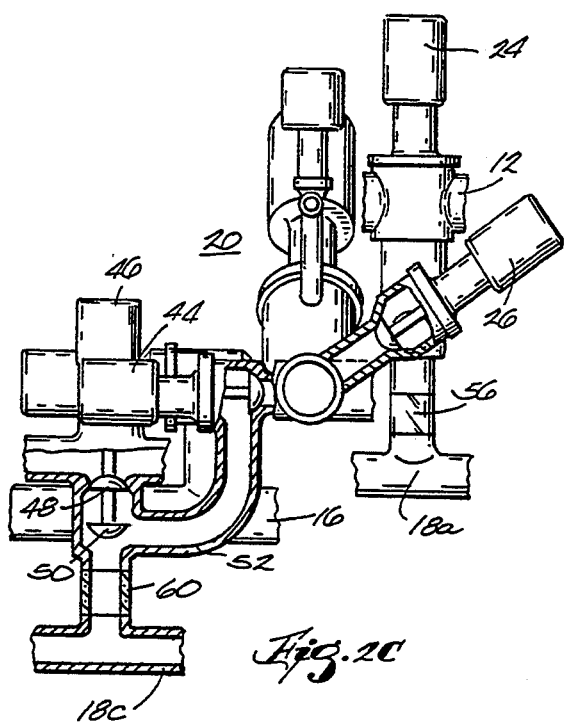
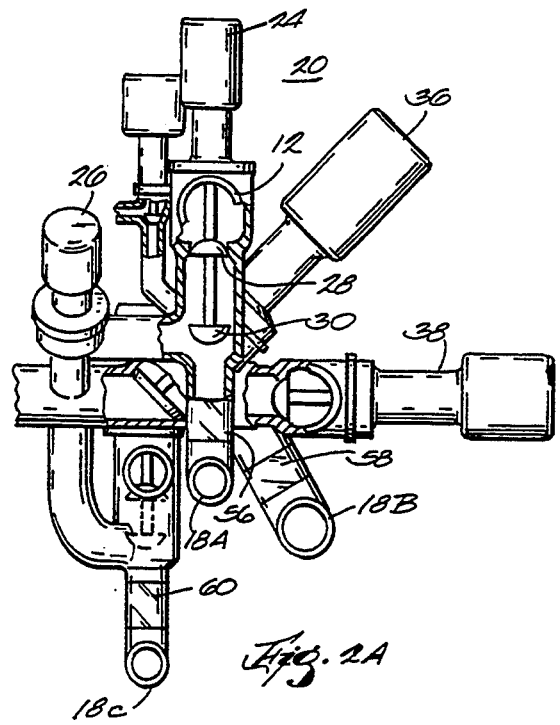

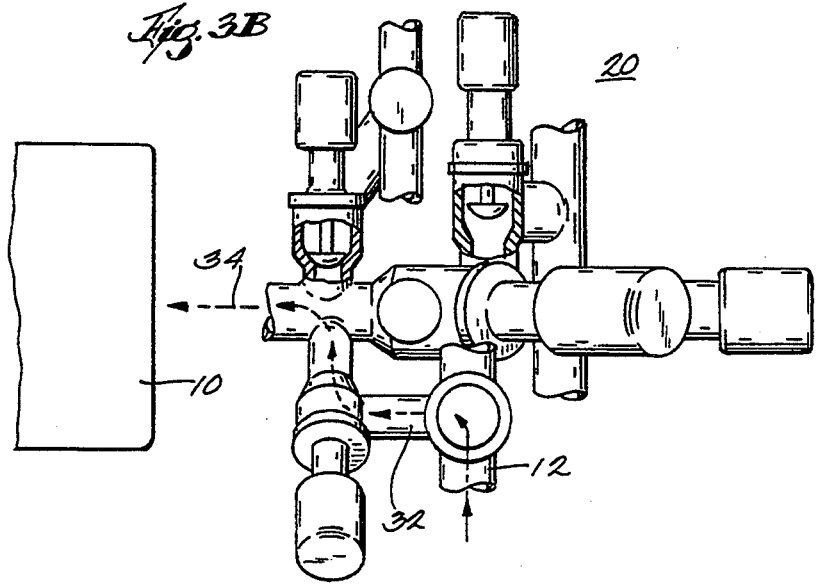
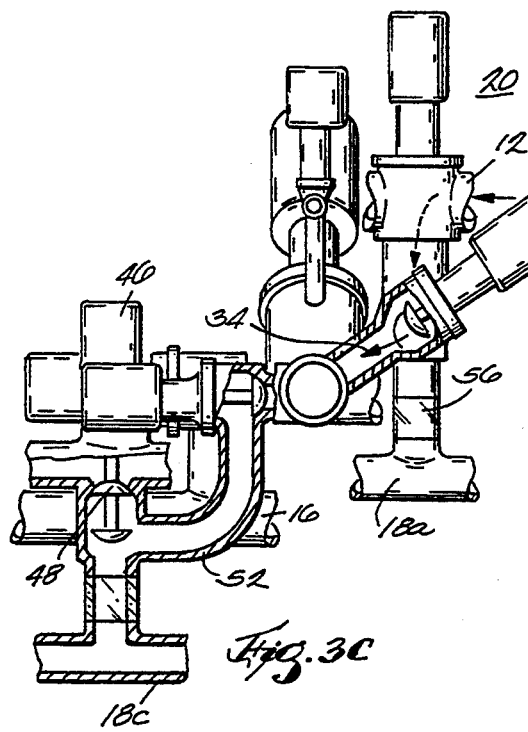
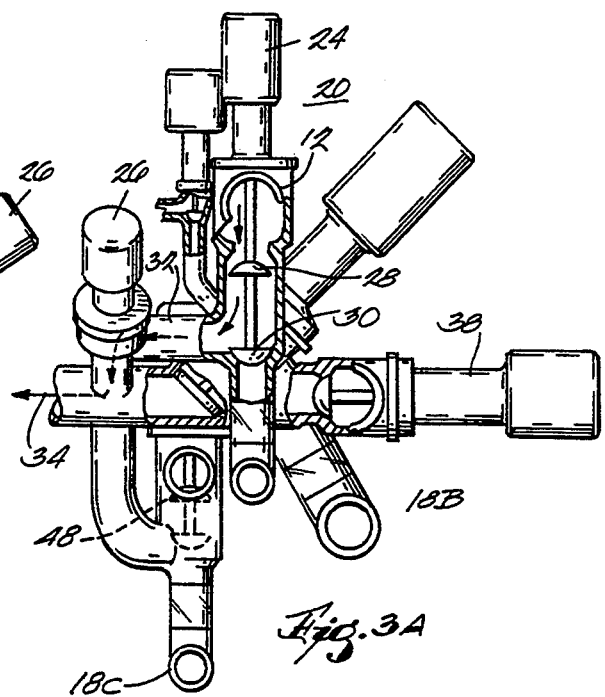

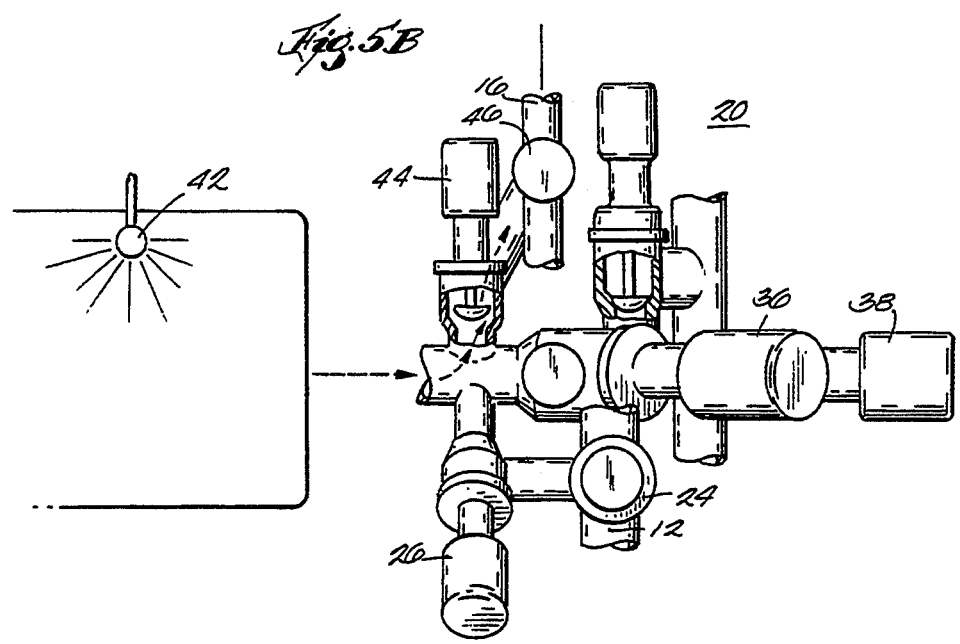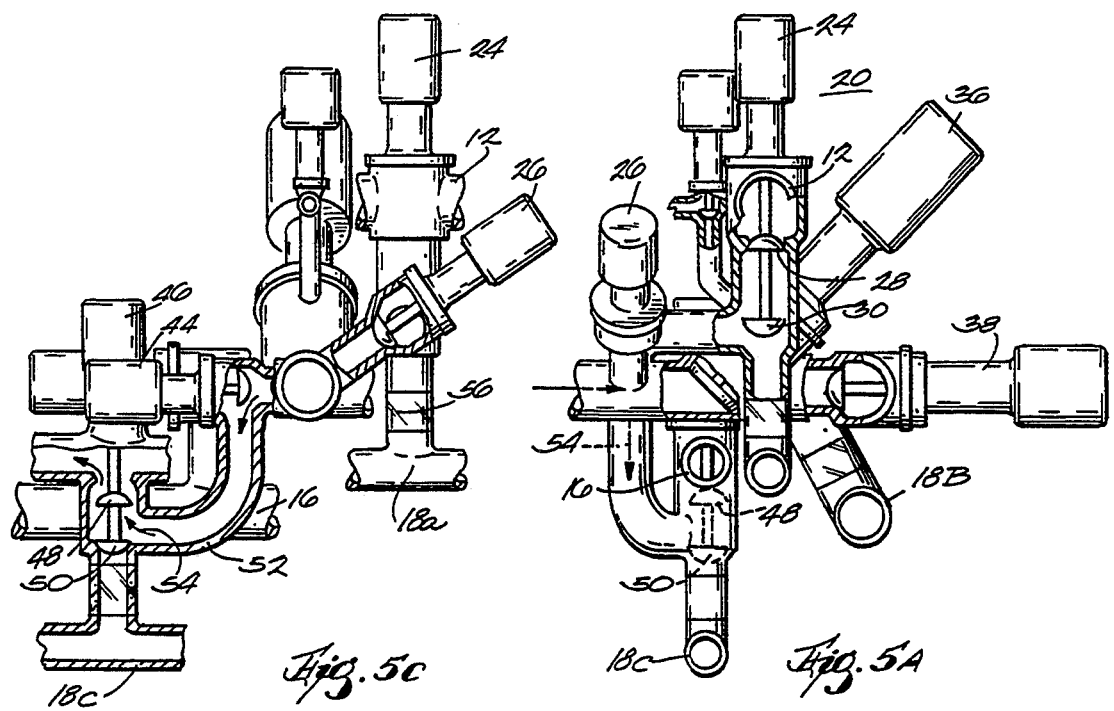

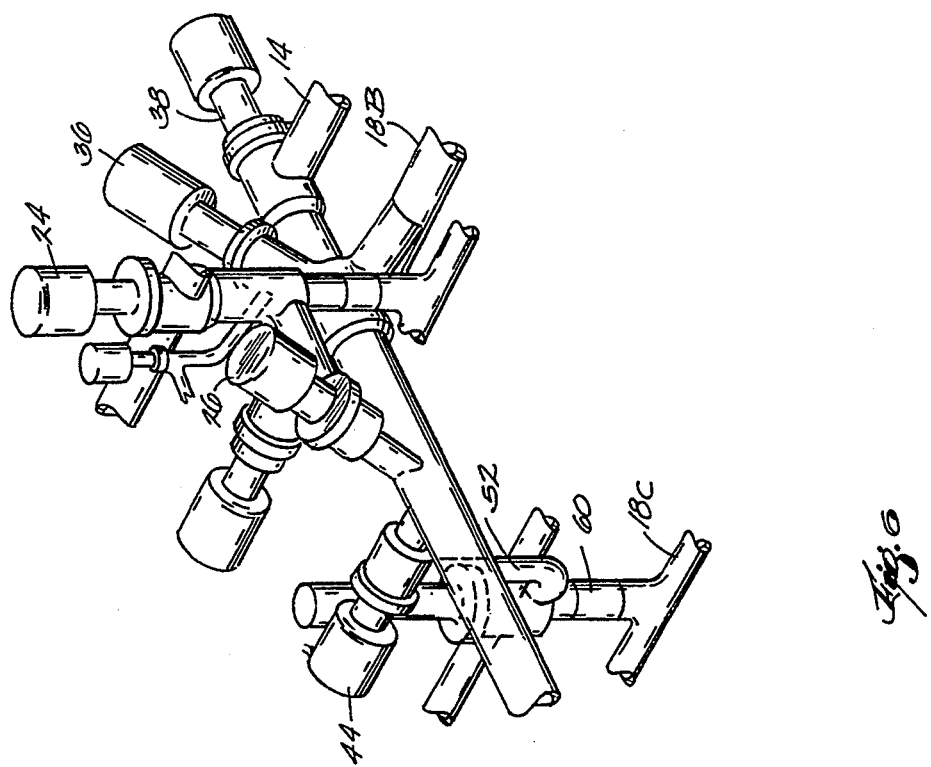
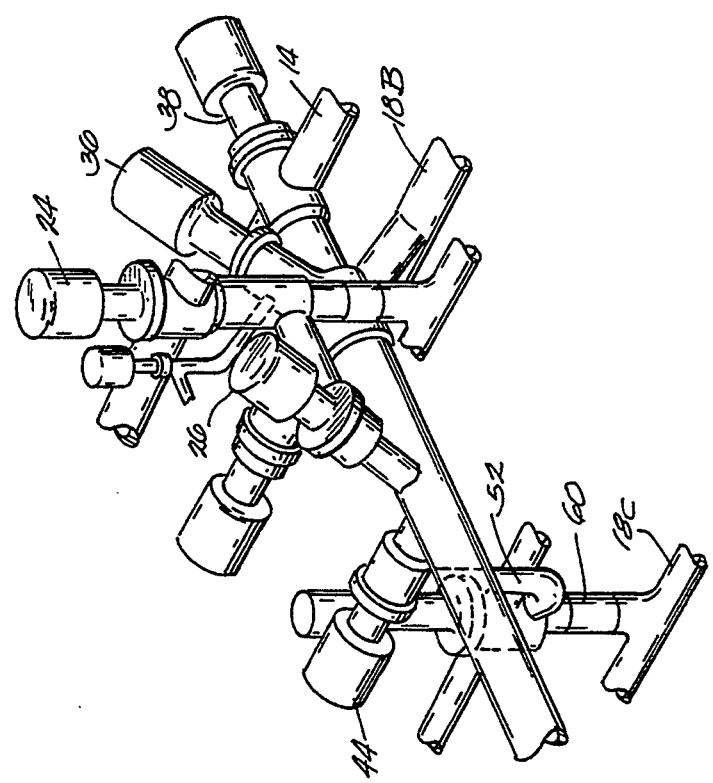
Fig. 6

VAT BOTTOM FILL CIP SYSTEM

BACKGROUND OF THE INVENTION

This invention relates to arrangements of valves to control fluid flow, and in particular to such valve arrangements which provide protection from accidental intermixing of the fluids.

In the past it has been customary to fill a vat of a food liquid, such as a vat of milk, or pharmaceuticals, or soft drinks, from the top, such as through a spray ball, and to drain it from the bottom. This was true because regulations require strict separation of the raw materials pumped into the vat from the product drained from the vat after processing inside the vat. Regulations also require strict separation of both the raw materials and the products from the cleaning solution with which the vat is flushed after draining of the product. To date this strict separation has not been possible with a single fill/drain inlet at the bottom of the vat. Further sanitary regulations require the provision of a full bore leak port, to enhance the above mentioned separation even more.

Moreover, the conventional top fill method often has undesirable side effects, in that substantial aeration of the fluid could occur during filling. Depending on the type of fluid being filled into the vat, the result of this aeration could be foaming and substantial reduction of filling efficiency.

This invention relates to improvements over the apparatus set forth above and to solutions to the problems raised or not solved thereby.

SUMMARY OF THE INVENTION

The invention relates to a fluid flow control assembly for controlling the flow of fluids to and from a number of containers, such as vats or tanks, and for controlling the communication of that flow with a number of conduits passing by those tanks. One conduit is provided for raw materials to be pumped into the tanks, another conduit for product to be drained out of the tanks after performing some process on the raw materials to produce the product, and a third conduit for draining clean-in-place (CIP) solution from the tanks. A tank inlet/outlet is connected to each tank, near the bottom thereof. The fluid flow control assembly which is the subject of this invention includes three sets of valves. A first set of valves regulates the flow of raw materials from the first conduit into the tanks. A second set of valves regulates the flow of product out of the tanks into the second conduit. A third set of valves regulates the flow of CIP solution out of the tanks into the third conduit. Each set of valves prevents flow of fluid into or out of its respective conduit when desired, such that one of the tanks can be being filled at the same time another of the tanks is being emptied of product and a third one of the tanks is being flushed with CIP solution. The valves are arranged to provide double block and bleed functionality for the fluids not intended to flow to or from the tank at a particular time. That is, each set of valves includes at least two valves, arranged so that both of the valves must be open to permit flow of the respective fluid. A leak conduit, at least a portion of which is transparent, is provided between the two valves of each set. That leak conduit is connected to a drain, such that any leakage from any of the valves of the assembly is discernable by means of the leak conduit.

Other objects and advantages of the invention will become apparent hereinafter.

DESCRIPTION OF THE DRAWINGS

FIG. 1 is a perspective view of a fluid distribution system, to which has been applied a valve assembly constructed according to a preferred embodiment of the invention.

FIG. 2A is a side elevational view of a valve assembly constructed according to a preferred embodiment of the invention, with cutaways showing the valves in a static position.

FIG. 2B is a top plan view of the valve assembly shown in FIG. 2A, with cutaways showing the valves in a static position.

FIG. 2C is a front elevational view of the valve assembly shown in FIG. 2A, with cutaways showing the valves in a static position.

FIG. 3A is a side elevational view of the valve assembly shown in FIG. 2A, with cutaways showing the raw material fill valves open, and all other valves in a static position.

FIG. 3B is a top plan view of the valve assembly shown in FIG. 2A, with cutaways showing the raw material fill valves open, and all other valves in a static position.

FIG. 3C is a front elevational view of the valve assembly shown in FIG. 2A, with cutaways showing the raw material fill valves open, and all other valves in a static position.

FIG. 5A is a side elevational view of the valve assembly shown in FIG. 2A, with cutaways showing the CIP drain valves open, and all other valves in a static position.

FIG. 5B is a top plan view of the valve assembly shown in FIG. 2A, with cutaways showing the CIP drain valves open, and all other valves in a static position.

FIG. 5C is a front elevational view of the valve assembly shown in FIG. 2A, with cutaways showing the CIP drain valves open, and all other valves in a static position.

FIG. 6 is a perspective view of the valve assembly shown in FIG. 2, with no cutaways.

DESCRIPTION OF THE PREFERRED EMBODIMENT

Figure 4B:
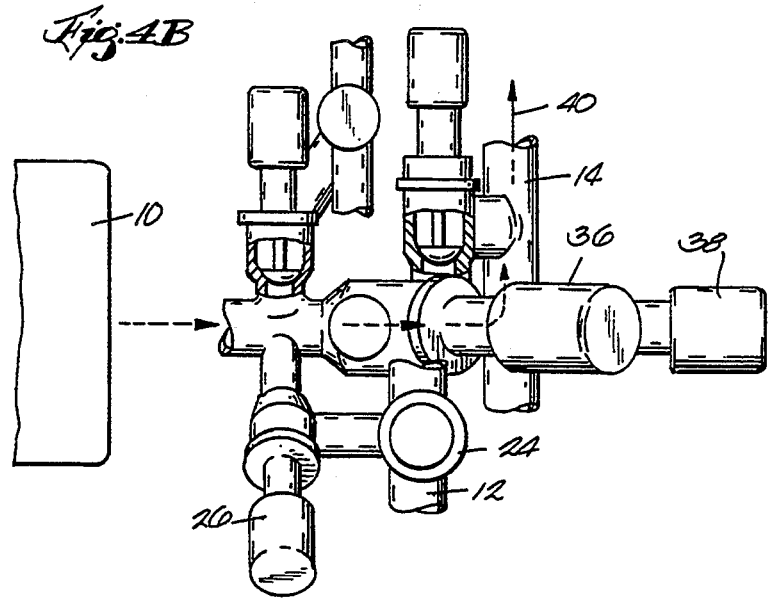
FIG. 4B is a top plan view of the valve assembly shown in FIG. 2A, with cutaways showing the product drain valves open, and all other valves in a static position.

Referring now to FIG. 1, there are shown a number of large tanks 10, which may be tanks or vats in which will be processed or stored the fluid to be controlled by the fluid control system which is the subject of this invention. Running past the front of the row of tanks 10 are a number of lines carrying various fluids to be controlled. For instance, a raw material line 12 is provided, in which is carried the raw materials to be filled into the tanks 10. A product line 14 is provided, into which the fluid is drained from the tanks 10 after processing. A line 16 for clean-in-place (CIP) solution is also provided, as are several drain lines 18, that is, lines that simply lead to drain.

One application for which this invention is particularly well suited is the control of flow of milk into and cheese curd out of milk processing vats. While the scope of the invention is certainly not to be limited to that application, for ease of reference herein, the following description will refer to raw material line 12 as the milk line 12 and the product line 14 as the curd line 14, and to milk flowing in connection with milk line 12 and curd flowing in connection with curd line 14.

The invention calls for a fluid flow control assembly 20 to be provided for connecting each of the lines 12, 14, 16, 18 to the tanks 10, and for controlling the flow of the fluids into and out of the tanks. This control assembly 20 is shown in more detail in the later drawing figures.

Referring now to FIGS. 2A, 2B, and 2C, the control assembly 20 includes a tank inlet/outlet 22, through which the control assembly maintains fluid communication with the tank 10. In these figures, all valves are shown in static position, that is, with product valves closed and leak detectors open. Situations where all valves would be in static position as shown in these three figures include the time when the product inside the tank 10 is being processed, and any pause times between the various filling, draining and cleaning steps to be described below. Moreover, in a properly designed and constructed system, static position is the position assumed when there is a failure of the compressed air system controlling the valves. By having the assembly 20 assume the static position on failure of the compressed air system, the assembly is made more fail-safe, so that risk of contamination is reduced in the event of such compressed air system failure.

Referring in addition to FIGS. 3A, 3B and 3C, the control assembly 20 includes a set of valves to control the flow of milk from the milk line 12 into the tank 10. This set of milk-fill valves includes a milk-fill divert valve 24 and a milk-fill shut-off valve 26. As shown in FIG. 2A, in the milk-fill divert valve 24, the upper plug 28 is normally closed, while the lower plug 30 is normally open, and as shown in FIG. 2C, the milk-fill shut-off valve 26 is normally closed. The outlet of the milk-fill divert valve 24 is connected to the inlet of the milk-fill shut-off valve 26 by a small milk-fill conduit 32. Then, when it is desired to milk fill the tank 10, the milk-fill divert valve 24 switches, as shown in FIG. 3A, so that the upper plug 28 is open and the lower plug 30 is closed. At the same time, milk-fill shut-off valve 26 opens. As shown by arrows 34, this opens a path for the milk to flow from the milk line 12, through milk-fill divert valve 24, through milk-fill conduit 32, through milk-fill shut-off valve 26, through tank inlet/outlet 22, and into the tank 10. When a sufficient amount of milk has filled into the tank 10, the valves 24, 26 are returned to their normal positions shown in FIGS. 2A and 2B.

Figure 4C:
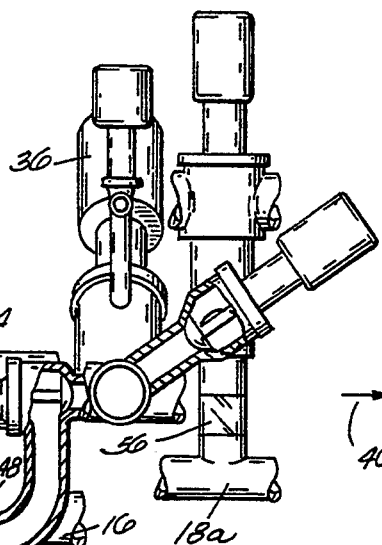
FIG. 4C is a front elevational view of the valve assembly shown in FIG. 2A, with cutaways showing the product drain valves open, and all other valves in a static position.
Figure 4A:
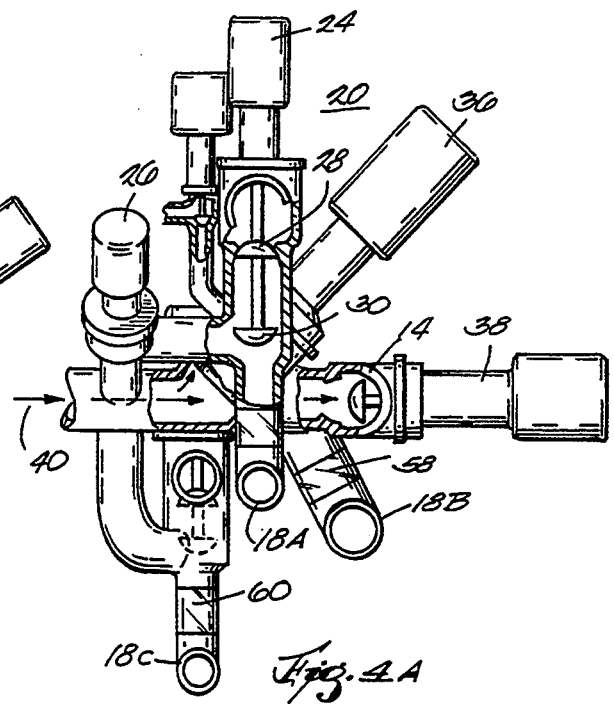
FIG. 4A is a side elevational view of the valve assembly shown in FIG. 2A, with cutaways showing the product drain valves open, and all other valves in a static position.

After the process to be accomplished in tank 10 is completed, the tank must be drained. The control assembly 20 includes a set of curd-drain valves to control this draining operation. Because the curd or other product will likely be thick and/or of a lumpy consistency, it is advantageous that the path from the tank 10 to the curd line 14 be as straight as reasonably possible. Accordingly, referring now to FIGS. 4A, 4B and 4C, the set of curd-drain valves includes a transverse valve 36 having a straight-through path, which path is aligned with tank inlet/outlet 22. The outlet of the straight-through path of transverse valve 36 is connected to a curd shut-off valve 38. Thus when it is desired to drain curd from the tank 10, transverse valve 36 and shut-off valve 38 are opened, and the curd passes as shown by arrows 40 from the tank 10, through tank inlet/outlet 22, through transverse valve 36, through curd shut-off valve 38, and into curd line 14.

After the curd is drained from the tank 10, the tank must be cleaned before the cycle can be started again. It is conventional therefore to provide a sprayball 42 (FIG. 5B) inside tank 10, by which CIP solution is introduced into the tank. Accordingly the invention calls for the control assembly 22 to include a set of valves for regulating the draining of CIP solution out of the tank 10. Referring now in detail to FIGS. 5A, 5B and 5C, the CIP drain valves include a CIP shut-off valve 44 connected to tank inlet/outlet 22, and a CIP divert valve 46. The divert valve 46 has an upper plug 48 that is normally closed, and lower plug 50 that is normally open, both as shown best in FIG. 2C. The CIP shut-off valve 44 is normally closed. The outlet of the CIP shut-off valve 44 is connected to the CIP divert valve 46 by a small CIP drain conduit 52, and one outlet of CIP divert valve 46 is connected to the CIP line 16. Then, when it is desired to drain CIP solution from tank 10, the shut-off valve 44 is opened and the divert valve 46 is switched so that the upper plug 48 is open and the lower plug 50 is closed. This opens a path for the CIP solution to flow, as shown by arrows 54, from tank 10, through tank inlet/outlet 22, through CIP shut-off valve 44, through CIP drain conduit 52, through CIP divert valve 46 and into CIP line 16. When a sufficient amount of CIP solution has been sprayed into tank 10 and drained, valves 44, 46 return to their normal positions as shown in FIG. 2C.

One of the unique features of this invention is that each of the valve sets provides double block and bleed functionality, to protect the milk line 12 and the curd line 14 from leakage of any of the valves, particularly the valves 44, 46 handling CIP solution. That is, each line is protected by two closed valves, and a full bore leak port therebetween.

Particular reference is made again to FIGS. 2A, 2B and 2C, where all valves are in static position. As shown there, in one double-block-and-bleed structure, the two blocks are provided by upper plug 28 of milk-fill divert valve 24 and by milk-fill shut-off valve 26, with the bleed function supplied by a transparent full bore leak port 56 providing a connection to drain line 18A. In another double-block-and-bleed structure, the two blocks are provided by transverse valve 36 and shut-off valve 38, with the bleed function supplied by a transparent full bore leak port 58 providing a connection to drain line 18B. And in a third double-block-and-bleed structure, the two blocks are provided by the upper plug 48 of CIP divert valve 46 and shut-off valve 44, with the bleed function supplied by a transparent full bore leak port 60 providing a connection to drain line 18C.

Thus the invention provides the ability to fill and drain tanks from the bottom, via the same port, to avoid all the disadvantages of filling from the top via a sprayball, and still provides compliance with sanitary regulations requiring full bore leak ports.

While the apparatus hereinbefore described is effectively adapted to fulfill the aforesaid objects, it is to be understood that the invention is not intended to be limited to the specific preferred embodiment of vat bottom fill CIP system set forth above. Rather, it is to be taken as including all reasonable equivalents to the subject matter of the appended claims.

We claim:

1. A fluid flow control assembly for controlling the flow of fluids to and from a container, and controlling the communication of that flow with conduits passing by said container, a first conduit for product to be pumped into said container, a second conduit for product to be drained out of said container, and a third conduit for draining of CIP solution from said containers, said control assembly comprising:
   a first set of valves for regulating the flow of fluid product from the first conduit into the container;
   a second set of valves for regulating the flow of fluid product out of the container into the second conduit; and
   a third set of valves for regulating the flow of CIP solution out of the container into the third conduit;
   each set of valves preventing flow of fluid into or out of its respective conduit when desired.

2. A fluid flow control assembly as recited in claim 1 wherein all of said valves are arranged to provide double block and bleed functionality for the fluids not intended to flow to or from the container at at particular time.

3. A fluid flow control assembly as recited in claim 1 wherein each set of valves includes at least two valves, arranged so that both of said valves must be open to permit flow of the respective fluid.

4. A fluid flow control assembly as recited in claim 3 wherein a leak conduit is provided between the two valves of each set, that leak conduit being connected to a drain, such that any leakage from any of the valves of the assembly is discernable by means of the leak conduit.

5. A fluid flow control assembly as recited in claim 3 wherein a part of each leak conduit is transparent, to permit viewing of any leakage into the leak conduit.

6. A fluid flow control assembly for controlling the flow of fluids to and from a number of containers, and controlling the communication of that flow with conduits passing by said containers, a first conduit for product to be pumped into said containers, a second conduit for product to be drained out of said containers, and a third conduit for draining of CIP solution from said containers, said fluid flow control assembly comprising:
   a first set of valves for regulating the flow of product from the first conduit into the containers;
   a second set of valves for regulating the flow of product out of the containers into the second conduit; and
   a third set of valves for regulating the flow of CIP solution out of the containers into the third conduit;
   each set of valves preventing flow of fluid into or out of its respective conduit when desired, such that one of the containers can be being filled at the same time another of the containers is being emptied of product and a third one of the containers is being flushed with CIP solution.

7. A fluid flow control assembly as recited in claim 6 wherein all of said valves are arranged to provide double block and bleed functionality for the fluids not intended to flow to or from any one of the containers at any particular time.

* * * * *